(12) United States Patent
Kang et al.

(10) Patent No.: US 11,783,745 B2
(45) Date of Patent: Oct. 10, 2023

(54) VOLTAGE CONVERTER, METHOD OF VOLTAGE CONVERSION USING THE SAME AND DISPLAY APPARATUS INCLUDING THE SAME

(71) Applicant: Samsung Display Co., Ltd., Yongin-Si (KR)

(72) Inventors: Kwanghun Kang, Hwaseong-si (KR); Sungchun Park, Suwon-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

(21) Appl. No.: 17/502,253

(22) Filed: Oct. 15, 2021

(65) Prior Publication Data

US 2022/0189367 A1    Jun. 16, 2022

(30) Foreign Application Priority Data

Dec. 10, 2020    (KR) .................. 10-2020-0172333

(51) Int. Cl.
*G09G 3/00* (2006.01)
*G09G 3/20* (2006.01)
*H02M 3/156* (2006.01)
*H02M 3/158* (2006.01)

(52) U.S. Cl.
CPC ......... *G09G 3/20* (2013.01); *G09G 2330/028* (2013.01); *H02M 3/156* (2013.01); *H02M 3/158* (2013.01); *H02M 3/1588* (2013.01)

(58) Field of Classification Search
None
See application file for complete search history.

(56) References Cited

U.S. PATENT DOCUMENTS

2017/0250605 A1 *  8/2017  Park ................... G09G 3/3275

FOREIGN PATENT DOCUMENTS

| KR | 10-2010-0046684 A | 5/2010 |
| KR | 10-2011-0037787 A | 4/2011 |
| KR | 10-2017-0099422 A | 9/2017 |
| KR | 10-2126799 B1 | 6/2020 |

* cited by examiner

*Primary Examiner* — Roberto W Flores
*Assistant Examiner* — Donna V Bocar
(74) *Attorney, Agent, or Firm* — Innovation Counsel LLP

(57) ABSTRACT

A voltage converter includes a first switching element, a second switching element, and a forced maintaining circuit. The first switching element is configured to operate based on a switching control signal. The second switching element is connected to the first switching element. The second switching element is configured to operate based on the switching control signal in a synchronous mode and operate in a diode mode in an asynchronous mode. The forced maintaining circuit is connected to the second switching element and configured to maintain the asynchronous mode for a forced maintaining period after entering the asynchronous mode.

19 Claims, 11 Drawing Sheets

FIG. 11

| SET | COMMAND | DESCRIPTION |
|-----|---------|-------------|
| 1 | 4.5V | 50mV STEP |
| 2 | 4.45V | |
| 3 | 4.4V | |
| 4 | 4.35V | |

FIG. 12

| SET | COMMAND | DESCRIPTION |
|-----|---------|-------------|
| 1 | DIRECTLY | DIRECTLY DEFAULT |
| 2 | 100us | |
| 3 | 500us | |
| 4 | 1ms | |

FIG. 13

| SET | COMMAND | DESCRIPTION |
|---|---|---|
| 1 | 25mV | |
| 2 | 50mV | |
| 3 | 70mV | |
| 4 | 100mV | |

FIG. 14

| SET | COMMAND | DESCRIPTION |
|---|---|---|
| 1 | 17ms | |
| 2 | 34ms | 1FRAME(17ms) STEP |
| 3 | 51ms | |
| 4 | 68ms | |

VOLTAGE CONVERTER, METHOD OF VOLTAGE CONVERSION USING THE SAME AND DISPLAY APPARATUS INCLUDING THE SAME

PRIORITY STATEMENT

This application claims priority under 35 U.S.C. § 119 to Korean Patent Application No. 10-2020-0172333, filed on Dec. 10, 2020, in the Korean Intellectual Property Office KIPO, the disclosure of which is herein incorporated by reference in its entirety.

BACKGROUND

1. Field

The present disclosure relates to a voltage converter, a method of voltage conversion using the voltage converter, and a display apparatus including the voltage converter. More particularly, the present disclosure relates to a voltage converter that is capable of stably generating an output voltage despites changes of an input voltage, a method of voltage conversion using the voltage converter, and a display apparatus including the voltage converter.

2. Description of the Related Art

A display apparatus includes a voltage converter to convert a battery voltage to a DC voltage for operating a display panel. As a capacity of a battery increases, the battery voltage is gradually increasing.

In addition, as the capacity of the battery increases, a range of the battery voltage may increase and an adapter voltage may also increase according to a demand of high speed charging.

Due to the increase of the battery voltage and the adapter voltage, the stability of the voltage converter may be compromised. For example, when an input voltage of the voltage converter gets higher than an output voltage of the voltage converter due to the increase of the battery voltage and the adapter voltage, the voltage converter may not be able to generate a stable output voltage.

In addition, a noise in the input voltage of the voltage converter may frequently switch a converting mode of the voltage converter causing a flicker of the display panel, and accordingly a display quality of the display panel may be deteriorated.

SUMMARY

The present inventive concept provides a voltage converter that is capable of stably generating an output voltage and enhancing a display quality of a display panel.

The present inventive concept also provides a method of voltage conversion using the voltage converter.

The present inventive concept also provides a display apparatus including the voltage converter.

In an embodiment, the voltage converter includes a first switching element, a second switching element, and a forced maintaining circuit. The first switching element is configured to operate based on a switching control signal. The second switching element is connected to the first switching element. The second switching element is configured to operate based on the switching control signal in a synchronous mode. The second switching element is further configured to operate in a diode mode in an asynchronous mode. The forced maintaining circuit is connected to the second switching element and is configured to maintain the asynchronous mode for a forced maintaining period after entering the asynchronous mode.

In an embodiment, the second switching element may include a body diode and the body diode of the second switching element may be off in the synchronous mode.

In an embodiment, the second switching element may be turned off and the body diode of the second switching element may be on in the asynchronous mode.

In an embodiment, an entering threshold voltage of the asynchronous mode to enter the asynchronous mode from the synchronous mode may be different from an exiting threshold voltage of the asynchronous mode to exit from the asynchronous mode to the synchronous mode.

In an embodiment, the entering threshold voltage of the asynchronous mode may be higher than the exiting threshold voltage of the asynchronous mode.

In an embodiment, the voltage converter may further include an OR gate configured to operate an OR operation for the switching control signal and a forced maintaining signal of the forced maintaining circuit.

In an embodiment, the forced maintaining circuit may include a comparator, a counter, and a latch. The comparator may be configured to compare an input voltage and an output reference voltage and generate a comparison signal. The counter may be configured to receive the comparison signal of the comparator and generate a count signal. The latch may be configured to receive the comparison signal of the comparator and the count signal of the counter and output the forced maintaining signal.

In an embodiment, the comparison signal of one may represent entering the asynchronous mode. When the comparison signal is one, the counter may be reset and configured to start to count the forced maintaining period and the count signal of the counter may be zero.

In an embodiment, the count signal of zero may represent that the forced maintaining period is in progress. When the count signal is zero, the forced maintaining signal may be one. When the forced maintaining signal is one, the asynchronous mode may be forcibly maintained.

In an embodiment, when the forced maintaining period expires, the counter may be configured to output the count signal of one. When the count signal is one and the comparison signal is zero, the forced maintaining signal may be zero. When the comparison signal is zero, the asynchronous mode may not be forcibly maintained.

In an embodiment, when an input voltage exceeds an entering threshold voltage of the asynchronous mode, the asynchronous mode may start. When the input voltage is lower than the entering threshold voltage of the asynchronous mode and higher than an exiting threshold voltage of the asynchronous mode after a deglitch time has elapsed since the asynchronous mode started, a forced maintaining signal of the forced maintaining circuit may be zero and the asynchronous mode may be maintained.

In an embodiment, when an input voltage exceeds an entering threshold voltage of the asynchronous mode, the asynchronous mode may start. When the input voltage is higher than the entering threshold voltage of the asynchronous mode after a deglitch time has elapsed since the asynchronous mode started, a forced maintaining signal of the forced maintaining circuit may be one and the asynchronous mode may be forcibly maintained during the forced maintaining period.

In an embodiment, when an input voltage exceeds an entering threshold voltage of the asynchronous mode, the asynchronous mode may start. When the input voltage is higher than the entering threshold voltage of the asynchronous mode after a deglitch time has elapsed since the asynchronous mode started, a forced maintaining signal of the forced maintaining circuit may be one and the asynchronous mode may be forcibly maintained during the forced maintaining period. When the input voltage gets lower than an exiting threshold voltage of the asynchronous mode in the forced maintaining period, the synchronous mode may start at an end of the forced maintaining period.

In an embodiment, the voltage converter may further include an activating switch disposed between the forced maintaining circuit and the second switching element. The activating switch may be configured to enable and disable the forced maintaining circuit.

In an embodiment, a method of voltage conversion includes: operating a first switching element based on a switching control signal; in a synchronous mode, operating a second switching element based on the switching control signal; in an asynchronous mode, operating the second switching element in a diode mode by turning off the second switching element; and maintaining the asynchronous mode for a forced maintaining period after entering the asynchronous mode using a forced maintaining circuit that is connected to the second switching element.

In an embodiment, the second switching element may include a body diode, and the body diode of the second switching element may be off in the synchronous mode.

In an embodiment, the second switching element may be turned off and the body diode of the second switching element may be on in the asynchronous mode.

In an embodiment, the method may further include: starting the asynchronous mode when an input voltage exceeds an entering threshold voltage of the asynchronous mode; and determining whether the input voltage is higher than the entering threshold voltage of the asynchronous mode after a deglitch time has elapsed since the asynchronous mode started.

In an embodiment, when the input voltage is higher than the entering threshold voltage of the asynchronous mode after the deglitch time has elapsed since the asynchronous mode started, the asynchronous mode may be forcibly maintained during the forced maintaining period using the forced maintaining circuit.

In an embodiment of a display apparatus according to the present inventive concept, the display apparatus includes a display panel, a gate driver, a data driver and a power voltage generator. The display panel includes a plurality of gate lines, a plurality of data lines and a plurality of pixels connected to the plurality of gate lines and the plurality of data lines. The gate driver is configured to output a gate signal to the plurality of gate lines. The data driver is configured to output a data voltage to the plurality of data lines. The power voltage generator is configured to provide a power voltage to the display panel. The power voltage generator includes a first switching element, a second switching element and a forced maintaining circuit. The first switching element is configured to operate based on a switching control signal. The second switching element is connected to the first switching element. The second switching element is configured to operate based on the switching control signal in a synchronous mode. The second switching element is further configured to operate in a diode mode in an asynchronous mode. The forced maintaining circuit is connected to the second switching element. The forced maintaining circuit is configured to maintain the asynchronous mode for a forced maintaining period after entering the asynchronous mode.

According to the voltage converter, the method of voltage conversion using the voltage converter and the display apparatus including the voltage converter, the voltage converter operates in a synchronous mode and an asynchronous mode according to a level of the input voltage so that the voltage converter may stably generate the output voltage even though the input voltage is higher than the output voltage.

In addition, the entering threshold voltage and the exiting threshold voltage of the asynchronous mode that are set differently may prevent frequent switching of the a converting mode of the voltage converter near the threshold voltages.

In addition, when entering the asynchronous mode from the synchronous mode, the asynchronous mode may be forcibly maintained during the forced maintaining period. Accordingly, a noise in the input voltage of the voltage converter may not cause frequent switching of the converting mode, thereby preventing a flicker of the display panel. Thus, the display quality of the display panel may be enhanced.

BRIEF DESCRIPTION OF THE DRAWINGS

The above and other features and advantages of the present inventive concept will become more apparent by describing in detailed embodiments thereof with reference to the accompanying drawings, in which:

FIG. 11 is a table illustrating a case in which an entering threshold voltage of the asynchronous mode of the first converting part of FIG. 6 is changed by setting;

FIG. 12 is a table illustrating a case in which a deglitch time of the forced maintaining circuit of FIG. 7 is changed by setting;

FIG. 13 is a table illustrating a case in which a difference between the entering threshold voltage and an exiting threshold voltage of the asynchronous mode of the first converting part of FIG. 6 is changed by setting;

FIG. 14 is a table illustrating a case in which a forced maintaining period of the forced maintaining circuit of FIG. 7 is changed by setting.

DETAILED DESCRIPTION OF THE INVENTIVE CONCEPT

Hereinafter, the present inventive concept will be explained in detail with reference to the accompanying drawings.

Figure 1:
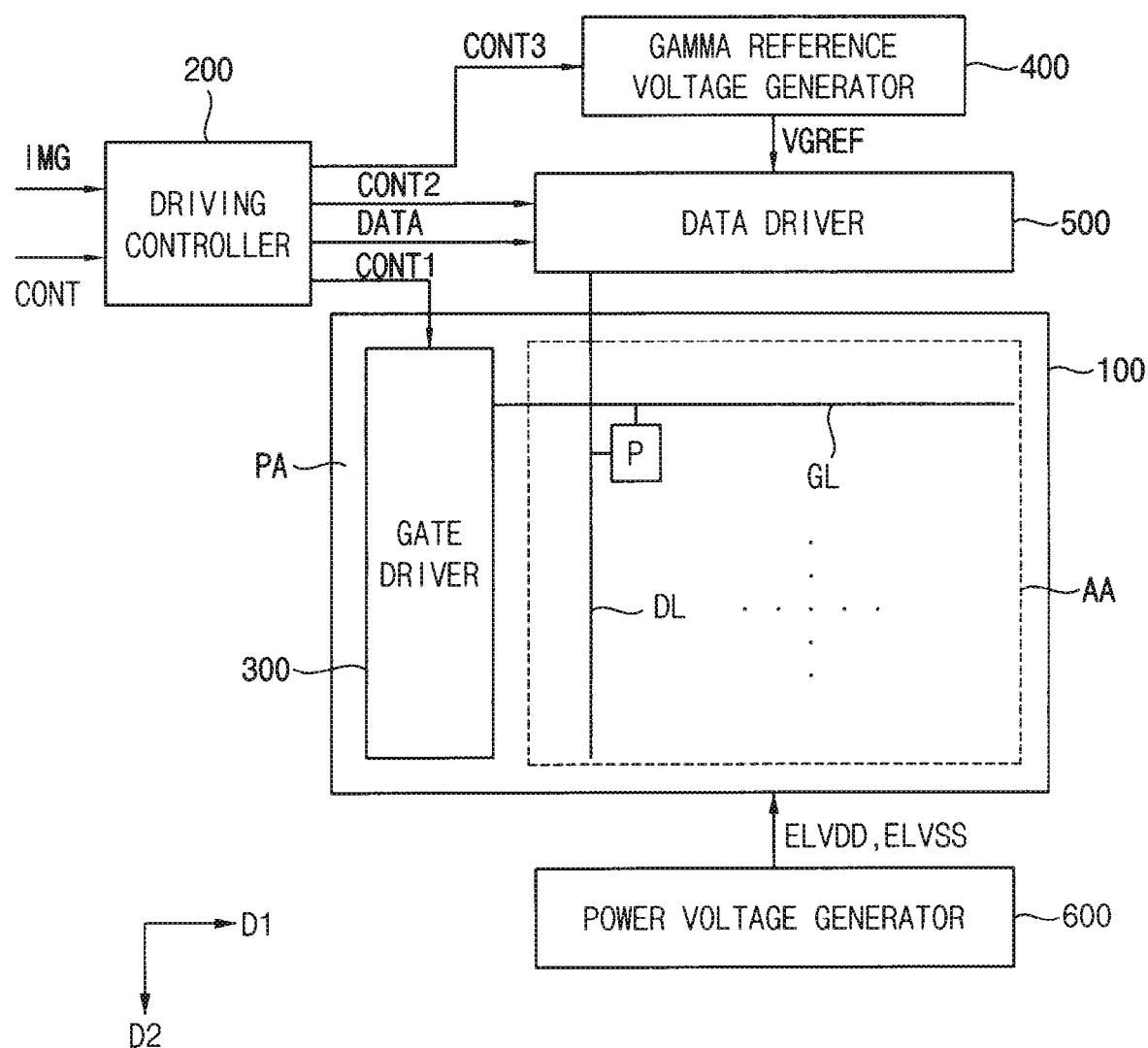
FIG. 1 is a block diagram illustrating a display apparatus according to an embodiment of the present inventive concept.

FIG. 1 is a block diagram illustrating a display apparatus according to an embodiment of the present inventive concept.

Referring to FIG. 1, the display apparatus includes a display panel 100 and a display panel driver. The display panel driver includes a driving controller 200, a gate driver 300, a gamma reference voltage generator 400, a data driver 500, and a power voltage generator 600.

For example, the driving controller 200 and the data driver 500 may be integrally formed. In another example, the driving controller 200, the gamma reference voltage generator 400, and the data driver 500 may be integrally formed. A driving module integrally including at least the driving controller 200 and the data driver 500 may be referred to as a timing controller embedded data driver (TED).

The display panel 100 may have a display region AA where a plurality of pixels P are disposed and a peripheral region PA adjacent to the display region AA. A driving circuit for driving the pixels P may be disposed in the peripheral region PA.

For example, the display panel 100 may be an organic light emitting display panel including an organic light emitting element.

The display panel 100 includes a plurality of gate lines GL, a plurality of data lines DL, and the plurality of pixels P electrically connected to the gate lines GL and the data lines DL. The gate lines GL extend in a first direction D1 and the data lines DL extend in a second direction D2 crossing the first direction D1.

The driving controller 200 receives input image data IMG and an input control signal CONT from an external apparatus (not shown). The input image data IMG may include red image data, green image data, and blue image data. The input image data IMG may include white image data in some embodiments. In other embodiments, the input image data IMG may include magenta image data, yellow image data, and cyan image data. The input control signal CONT may include a master clock signal and a data enable signal. The input control signal CONT may further include a vertical synchronizing signal and a horizontal synchronizing signal.

The driving controller 200 generates a first control signal CONT1, a second control signal CONT2, a third control signal CONT3, and a data signal DATA based on the input image data IMG and the input control signal CONT.

The driving controller 200 generates the first control signal CONT1 for controlling an operation of the gate driver 300 based on the input control signal CONT, and outputs the first control signal CONT1 to the gate driver 300. The first control signal CONT1 may further include a vertical start signal and a gate clock signal.

The driving controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the third control signal CONT3 for controlling an operation of the gamma reference voltage generator 400 based on the input control signal CONT, and outputs the third control signal CONT3 to the gamma reference voltage generator 400.

The gate driver 300 generates gate signals in response to the first control signal CONT1 received from the driving controller 200. The gate driver 300 outputs the gate signals to the gate lines GL. For example, the gate driver 300 may sequentially output the gate signals to the gate lines GL. For example, the gate driver 300 may be disposed in the peripheral region PA of the display panel 100. For example, the gate driver 300 may be disposed in the peripheral region PA of the display panel 100.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF has a value corresponding to a level of the data signal DATA.

In an embodiment, the gamma reference voltage generator 400 may be disposed in the driving controller 200 or in the data driver 500.

The data driver 500 receives the second control signal CONT2 and the data signal DATA from the driving controller 200, and receives the gamma reference voltage VGREF from the gamma reference voltage generator 400. The data driver 500 converts the data signal DATA into data voltages of an analog type using the gamma reference voltage VGREF and outputs the data voltages to the data lines DL. For example, the data driver 500 may be integrated in the peripheral region PA of the display panel 100. For example, the data driver 500 may be disposed in the peripheral region PA of the display panel 100.

The power voltage generator 600 may generate a power voltage and provide the power voltage to the display panel 100. For example, the power voltage generator 600 may provide a first power voltage ELVDD and a second power voltage ELVSS to the display panel 100. The first power voltage ELVDD and the second power voltage ELVSS may be applied to the pixels P including an organic light emitting element. For example, the first power voltage ELVDD may be a high power voltage, and the second power voltage ELVSS may be a low power voltage.

Figure 2:
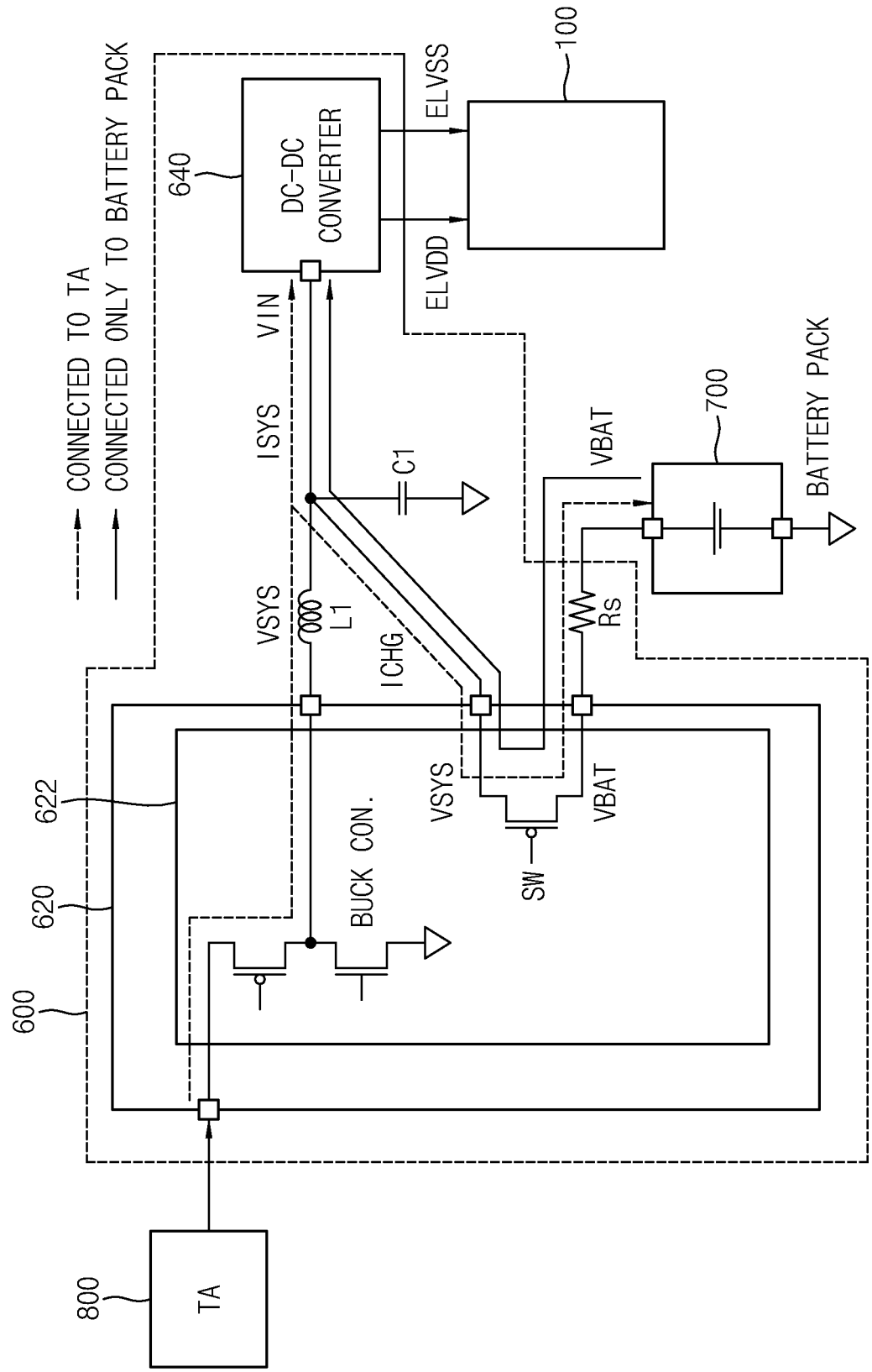
FIG. 2 is a block diagram illustrating a power voltage generator of FIG. 1.
Figure 3:
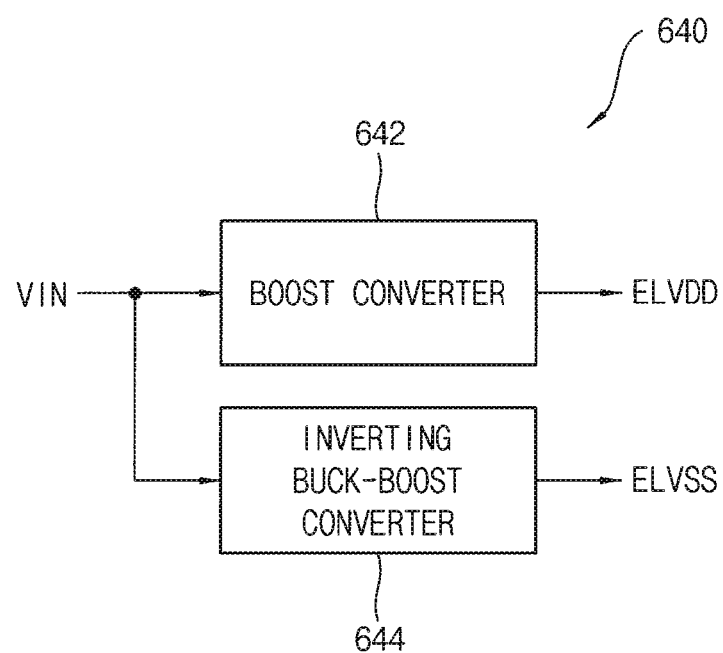
FIG. 3 is a block diagram illustrating a voltage converter included in the power voltage generator of FIG. 1.

FIG. 2 is a block diagram illustrating the power voltage generator 600 of FIG. 1. FIG. 3 is a block diagram illustrating a voltage converter included in the power voltage generator 600 of FIG. 1.

Referring to FIGS. 1 to 3, the power voltage generator 600 may include a power controller 620 and a voltage converter 640. The power controller 620 may include a charging block 622.

The charging block 622 may be connected to an adaptor (TA) 800 and a battery pack 700. When the adaptor 800 is connected to the charging block 622, an output current of the charging block 622 is divided into a current ISYS that flows through the voltage converter 640 and a current ICHG that flows through the battery pack 700. The current ISYS flowing through the voltage converter 640 drives the voltage converter 640. The current ICHG flowing through the battery pack 700 charges the battery pack 700.

The charging block 622 may include a first switching part BUCK CON. connected to the adaptor 800 to output a system voltage VSYS to the voltage converter 640.

The charging block 622 may include a second switching part SW connected to the battery pack 700 to output a battery voltage VBAT from the battery pack 700 to the voltage converter 640.

The voltage converter 640 is connected to the charging block 622 to receive an input voltage VIN. The input voltage VIN when the display apparatus is driven by the adaptor 800 may be different from the input voltage VIN when the display apparatus is driven by the battery pack 700. For example, the input voltage VIN may be the system voltage VSYS when the display apparatus is driven by the adaptor 800, and the input voltage VIN may be the battery voltage VBAT when the display apparatus is driven by the battery pack 700.

Referring to FIG. 3, the voltage converter 640 may include a first converting part 642 and a second converting part 644. The first converting part 642 may generate the first power voltage ELVDD based on the input voltage VIN. The second converting part 644 may generate the second power voltage ELVSS based on the input voltage VIN.

For example, the first converting part 642 may be a boost converter, and the second converting part 644 may be an inverting buck-boost converter.

The system voltage VSYS may be higher than the battery voltage VBAT. The system voltage VSYS may be also higher than the first power voltage ELVDD of the first converting part 642. The battery voltage VBAT may be lower than the first power voltage ELVDD of the first converting part 642. For example, the system voltage VSYS may be about 4.8V, the battery voltage VBAT may be about 4.4V, and the first power voltage ELVDD of the first converting part 642 may be about 4.6V. However, these voltages are only examples, and they may be varied without deviating from the scope of the present disclosure.

The first converting part 642 may be a boost converter that converts a low voltage to a high voltage. In a case where the input voltage VIN of the first converting part 642 is higher than the first power voltage ELVDD of the first converting part 642, the first converting part 642 may not normally operate, and the first power voltage ELVDD that is output from first converting part 642 may not be stable.

In the present embodiment, the first converting part 642 of the voltage converter 640 operates in different modes according to the input voltage VIN so that the first converting part 642 may stably generate the first power voltage ELVDD even though the input voltage VIN is higher than the first power voltage ELVDD.

The power voltage generator 600 may include an inductor L1, a capacitor C1, and a resistor Rs. A first end of the inductor L1 may be connected to an output terminal of the charging block 622. A second end of the inductor L1 may be connected to an input terminal of the voltage converter 640. A first end of the capacitor C1 may be connected to the input terminal of the voltage converter 640. A second end of the capacitor C1 may be connected to a ground. A first end of the resistor Rs may be connected to a battery input terminal of the charging block 622. A second end of the resistor Rs may be connected to the battery pack 700.

Figure 4:
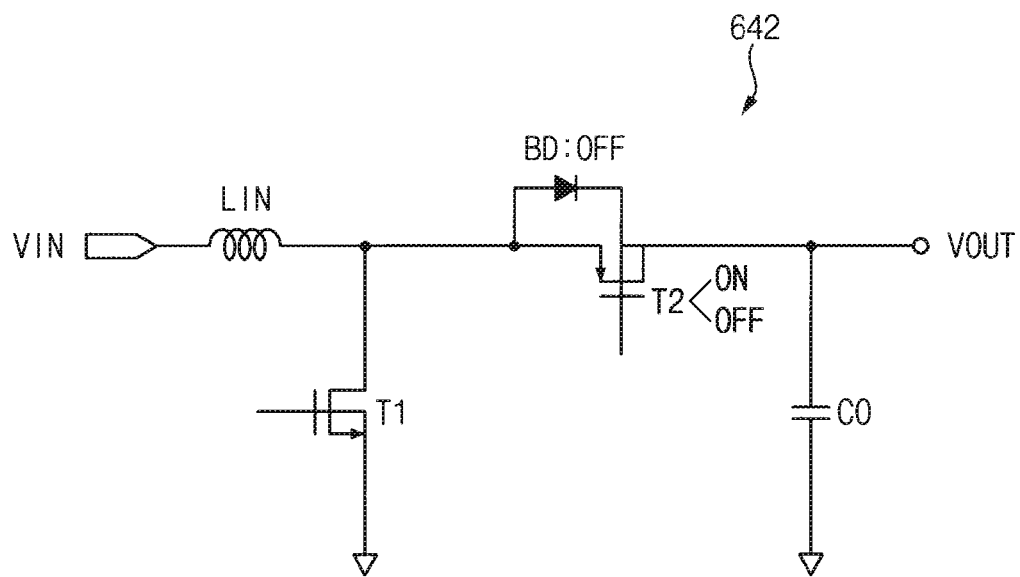
FIG. 4 is a circuit diagram illustrating an operation of a first converting part of FIG. 3 in a synchronous mode.
Figure 5:
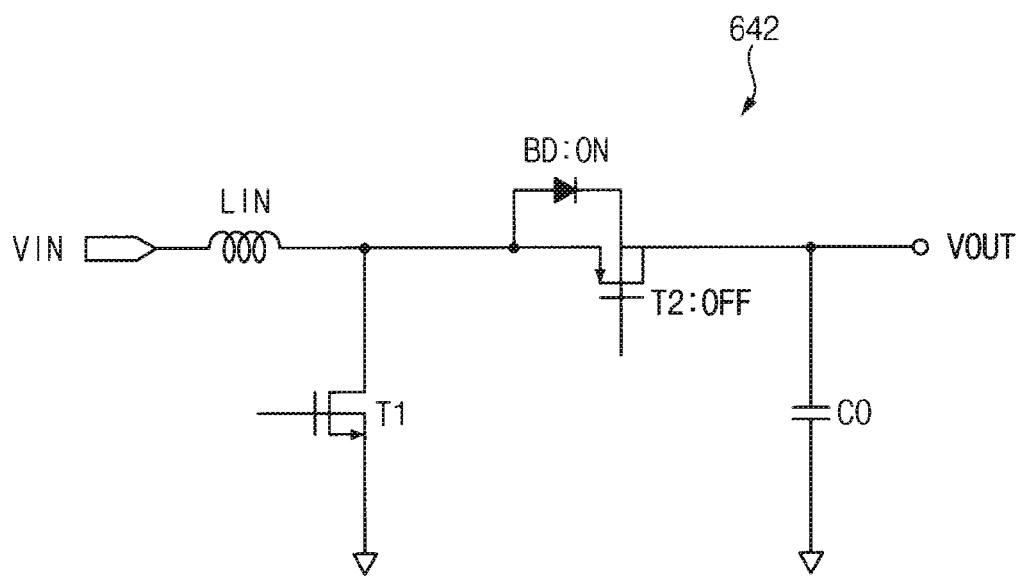
FIG. 5 is a circuit diagram illustrating an operation of the first converting part of FIG. 3 in an asynchronous mode.

FIG. 4 is a circuit diagram illustrating an operation of the first converting part 642 of FIG. 3 in a synchronous mode. FIG. 5 is a circuit diagram illustrating an operation of the first converting part 642 of FIG. 3 in an asynchronous mode.

Referring to FIGS. 1 to 5, the first converting part 642 may include a first switching element T1, a second switching element T2, an input inductor LIN, and an output capacitor CO. The first switching element T1 may be turned on and turned off based on a first switching control signal PWM1 (see FIG. 6). The second switching element T2 may be connected to the first switching element T1. In the synchronous mode, the second switching element T2 may be turned on and turned off based on a second switching control signal PWM2. In the asynchronous mode, the second switching element T2 may be turned off, and the second switching element T2 may operate in a diode mode.

The input inductor LIN may be coupled to an input terminal of the first converting part 642 where the input voltage VIN is received. An output voltage VOUT of the first converting part 642 may be the first power voltage ELVDD. The first power voltage ELVDD and the output voltage VOUT may be interchangeably used without deviating from the scope of the present disclosure. The output capacitor CO may be connected to an output terminal of the first converting part 642 where the output voltage VOUT is output.

The first converting part 642 may be operated in the synchronous mode or the asynchronous mode. In the synchronous mode, the first switching element T1 and the second switching element T2 may synchronously operate. In the asynchronous mode, the first switching element T1 and the second switching element T2 may not be synchronized.

In a case where the input voltage VIN is lower than the output voltage VOUT, the first converting part 642 may be operated in the synchronous mode. In the synchronous mode, the first switching element T1 and the second switching element T2 may be repetitively turned on and off based on the first switching control signal PWM1 and the second switching control signal PWM2, respectively, to generate the output voltage VOUT.

In a case where the input voltage VIN is higher than the output voltage VOUT or lower but close to the output voltage VOUT, a switching margin of the pulse width modulation signal may be insufficient so that the first converting part 642 may be operated in the asynchronous mode. In the asynchronous mode, the second switching element T2 may be turned off, and the second switching element T2 may operate in the diode mode to generate the output voltage VOUT.

In the synchronous mode, the second switching element T2 may be turned on and off, and a body diode BD of the second switching element T2 may be off. In the synchronous mode, however, the second switching element T2 may be synchronized with the first switching element T1. For example, when the first switching element T1 is turned on, the second switching element T2 may be turned off. In contrast, when the first switching element T1 is turned off, the second switching element T2 may be turned on.

In the asynchronous mode, the second switching element T2 may be turned off, and the body diode BD of the second switching element T2 may be on.

For example, a threshold voltage to enter the asynchronous mode from the synchronous mode may be different from a threshold voltage to exit from the asynchronous mode to the synchronous mode. Here, the threshold voltage to enter the asynchronous mode from the synchronous mode is referred to as an entering threshold voltage of the asynchronous mode, and the threshold voltage to exit from the asynchronous mode to the synchronous mode is referred to as an exiting threshold voltage of the asynchronous mode. For example, the entering threshold voltage of the asynchronous mode may be higher than the exiting threshold voltage of the asynchronous mode.

In a case where the entering threshold voltage of the asynchronous mode is set to be same as the exiting threshold voltage of the asynchronous mode, the converting mode may be frequently switched for the input voltage VIN being close to the entering threshold voltage. However, in a case where the entering threshold voltage of the asynchronous mode is set to be different from the exiting threshold voltage of the asynchronous mode, the converting mode may not be frequently switched for the input voltage VIN being close the threshold voltages.

Figure 6:
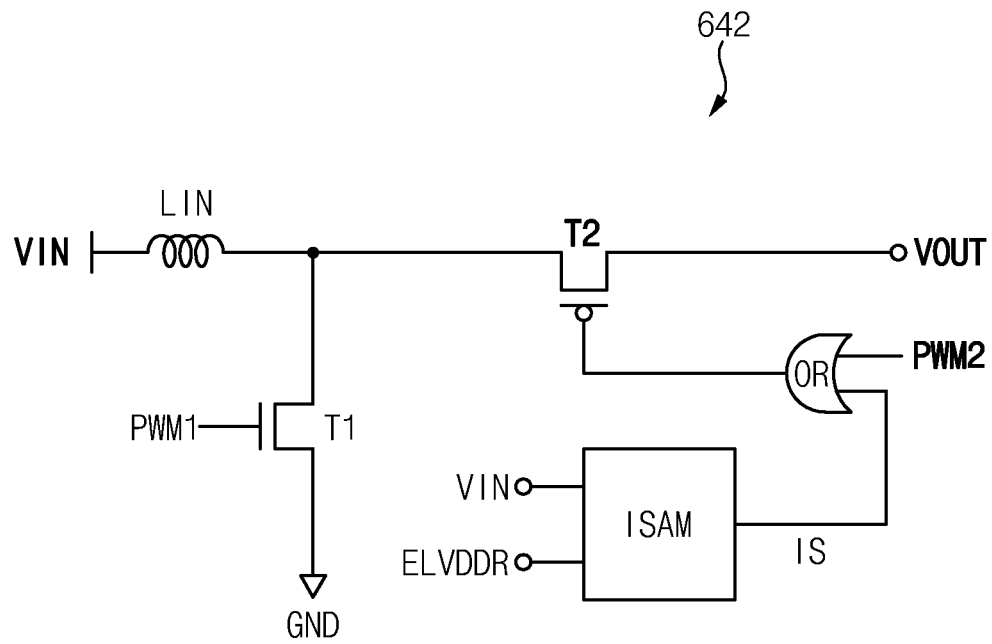
FIG. 6 is a circuit diagram illustrating the first converting part of FIG. 3.
Figure 7:
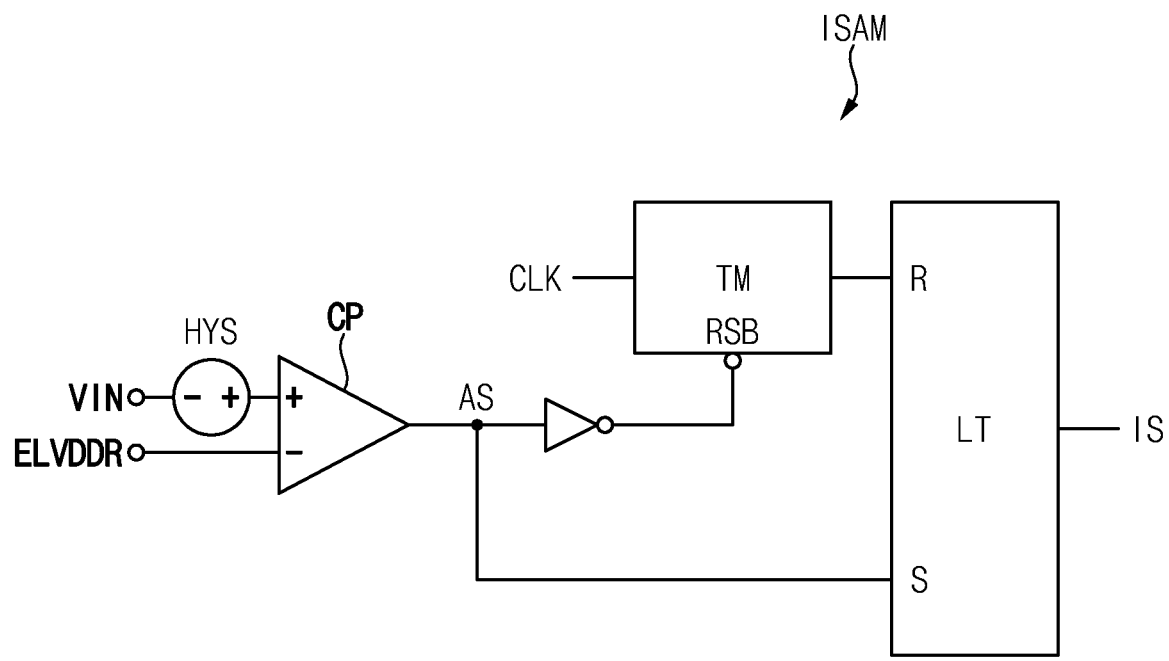
FIG. 7 is a circuit diagram illustrating a forced maintaining circuit of FIG. 6.
Figure 8:
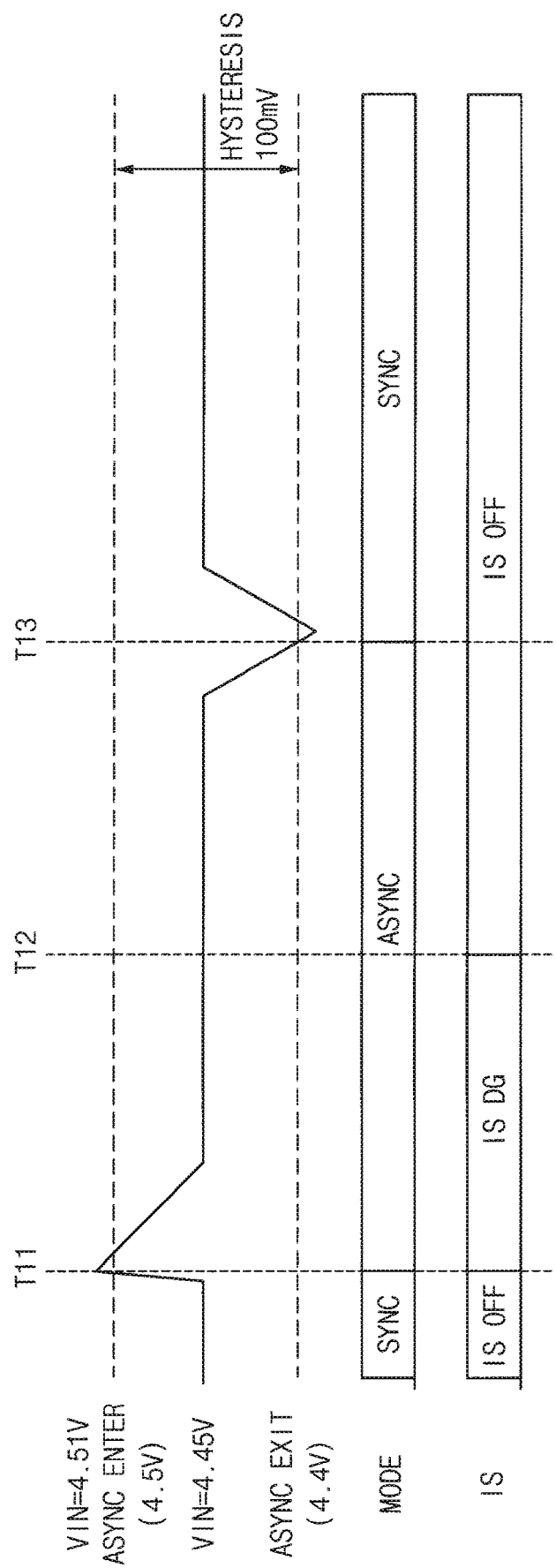
FIG. 8 is a timing diagram illustrating an example operation of the first converting part of FIG. 6.
Figure 9:
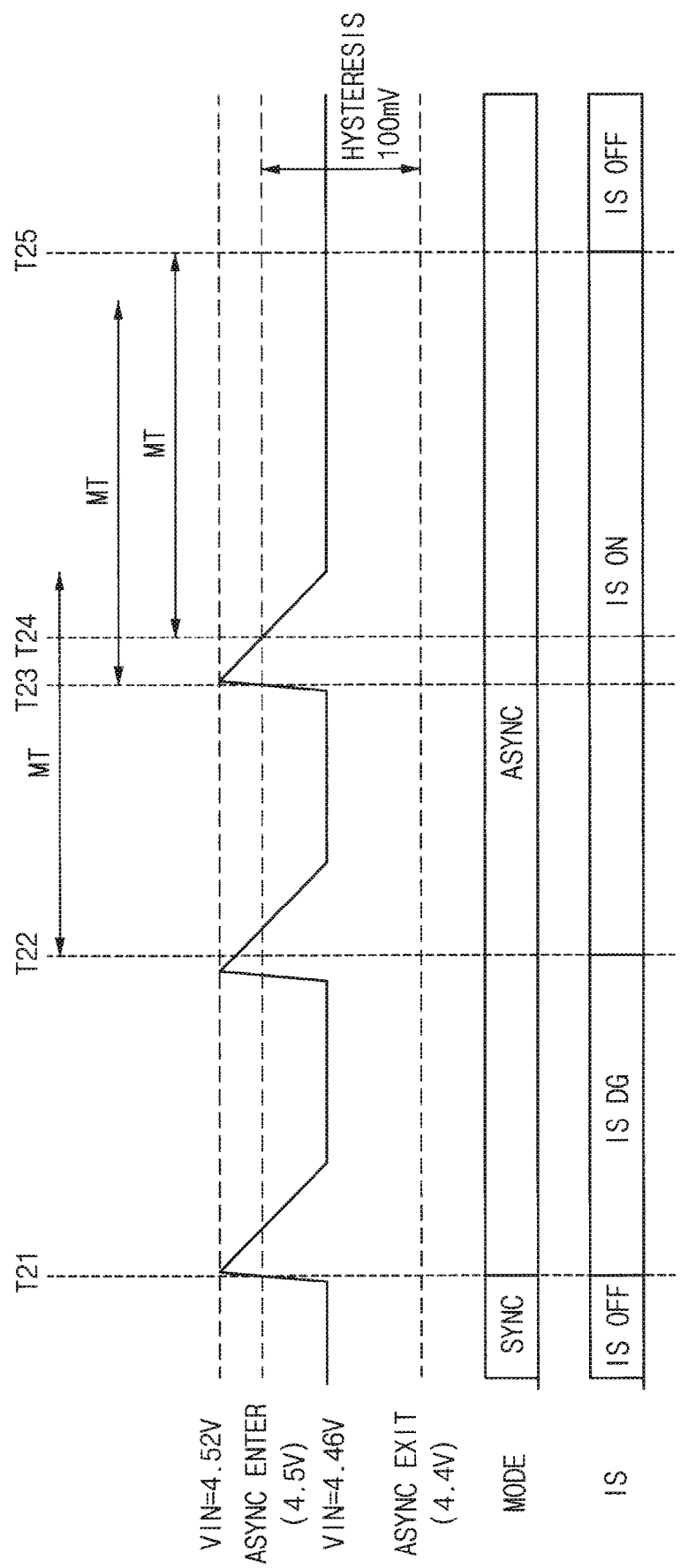
FIG. 9 is a timing diagram illustrating another operation of the first converting part of FIG. 6.
Figure 10:
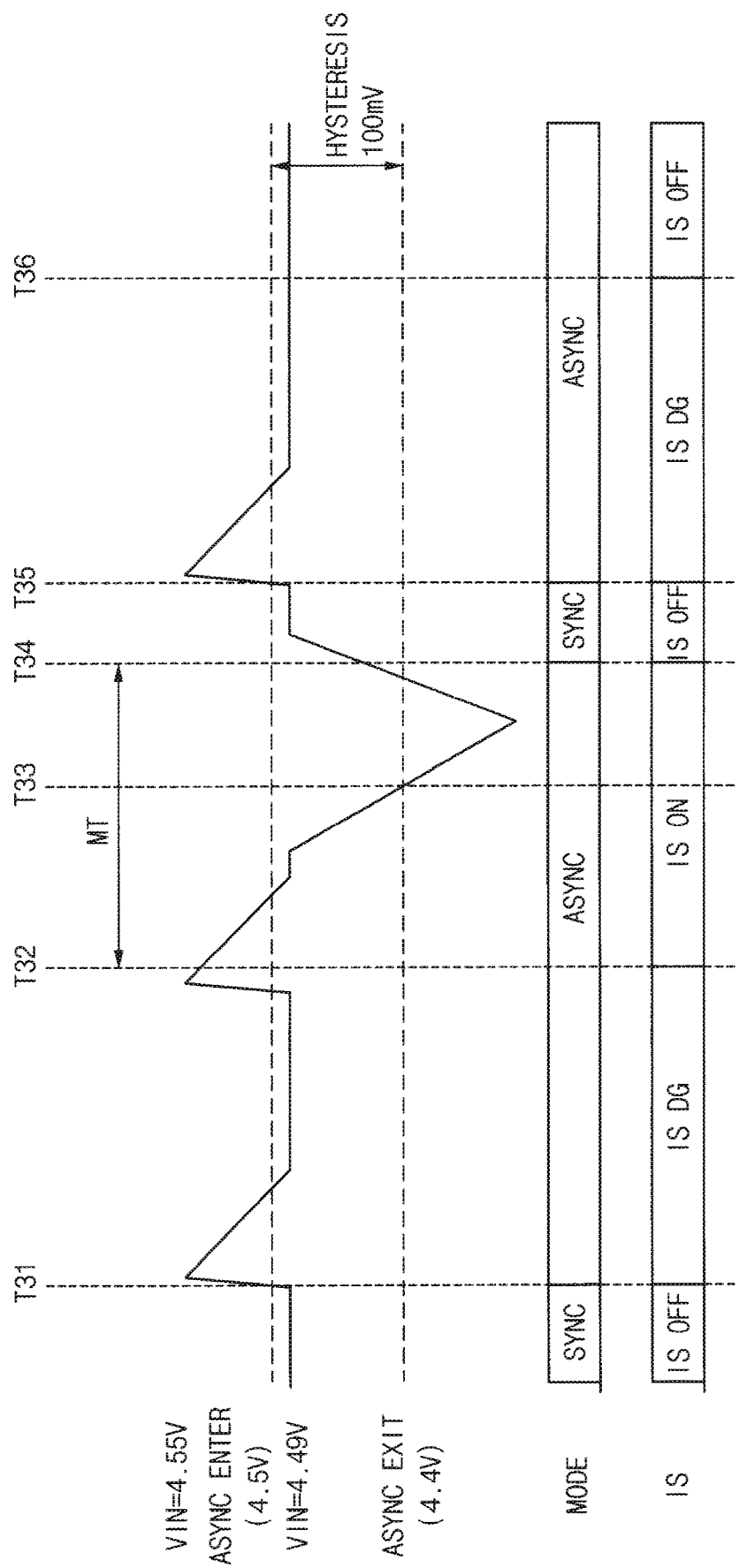
FIG. 10 is a timing diagram illustrating yet another operation of the first converting part of FIG. 6.

FIG. 6 is a circuit diagram illustrating the first converting part 642 of FIG. 3. FIG. 7 is a circuit diagram illustrating a forced maintaining circuit ISAM of FIG. 6. FIG. 8 is a timing diagram illustrating an example operation of the first converting part 642 of FIG. 6. FIG. 9 is a timing diagram illustrating another operation of the first converting part 642 of FIG. 6. FIG. 10 is a timing diagram illustrating yet another operation of the first converting part 642 of FIG. 6.

Referring to FIG. 6, the first converting part 642 includes the first switching element T1, the second switching element T2, and the forced maintaining circuit ISAM. The first switching element T1 may be turned on and off based on the first switching control signal PWM1. The second switching element T2 may be connected to the first switching element T1. In the synchronous mode, the second switching element T2 may be turned on and off based on the second switching control signal PWM2. In the asynchronous mode, the second switching element T2 may be turned off, and the second switching element T2 may operate in the diode mode. The forced maintaining circuit ISAM may be connected to the second switching element T2. The forced maintaining circuit ISAM may maintain the asynchronous mode for a forced maintaining period MT (see FIG. 9) after entering the asynchronous mode.

The input inductor LIN may be disposed between an input terminal where the input voltage VIN is applied and an input electrode of the second switching element T2. The input electrode of the second switching element T2 may be connected to an input electrode of the first switching element T1. An output electrode of the first switching element T1 may be connected to a ground GND. An output electrode of the second switching element T2 may be connected to an output terminal where the output voltage VOUT is output.

The first converting part 642 may further include an OR gate that operates an OR operation for the second switching control signal PWM2 and a forced maintaining signal IS that is received from the forced maintaining circuit ISAM and outputs a result of the OR operation to a control electrode of the second switching element T2.

In a case where the forced maintaining signal IS is one, the OR gate outputs a control signal of one to the control electrode of the second switching element T2 regardless of the second switching control signal PWM3. Thus, when the forced maintaining signal IS is one, the second switching element T2 may be turned off regardless of the second switching control signal PWM2.

Referring to FIG. 7, the forced maintaining circuit ISAM may include a comparator CP, a counter TM, and a RS latch LT. The comparator CP may compare the input voltage VIN and an output reference voltage ELVDDR. The output reference voltage ELVDDR may refer to a reference voltage of the first power voltage ELVDD. The counter TM may receive a comparison signal AS of the comparator CP and may count the forced maintaining period MT. The RS latch LT may receive the comparison signal AS of the comparator CP and a count signal of the counter TM and may output the forced maintaining signal IS accordingly.

An inverter may be disposed between an output electrode of the comparator CP and a reset terminal RSB of the counter TM.

A clock signal CLK for counting the forced maintaining period MT may be applied to the counter TM.

In a case where the input voltage VIN is higher than the output reference voltage ELVDDR (e.g., the entering threshold voltage of the asynchronous mode), the comparator CP may output one as the comparison signal AS. When the comparison signal AS of the comparator CP is one, it means entering the asynchronous mode. A hysteresis voltage HYS representing a difference between the entering threshold voltage of the asynchronous mode and the exiting threshold voltage of the asynchronous mode may be applied to an input terminal of the comparator CP that receives the input voltage VIN.

When the comparison signal AS of the comparator CP is one, the counter TM may be reset, the count signal of the counter TM may be set to zero, and the counter TM may start to count the forced maintaining period MT. The count signal of the counter TM may be applied to a reset terminal R of the RS latch LT. The comparison signal AS of the comparator CP may be applied to a signal terminal S of the RS latch LT.

The count signal being zero means that the forced maintaining period MT is in progress. When the count signal is zero, the forced maintaining signal IS that is output from the RS latch LT is one. When the forced maintaining signal IS is one, the asynchronous mode may be forcibly maintained.

When the forced maintaining period MT expires, the counter TM may output the count signal of one. When the count signal is one, and the comparison signal AS of the comparator CP is zero, the forced maintaining signal IS of the forced maintaining circuit ISAM may be zero. When the forced maintaining signal IS is zero, the asynchronous mode may not be forcibly maintained.

The converting mode may be switched from the synchronous mode SYNC to the asynchronous mode ASYNC due to a glitch or noise in the input voltage VIN. Referring to FIG. 8, the input voltage VIN (e.g., 4.51V) exceeds the entering threshold voltage ASYNC ENTER (e.g. 4.5V) of the asynchronous mode at T11. At this time, the asynchronous mode ASYNC may start.

At T12 after a deglitch time IS DG has elapsed from T11, the input voltage VIN is lower than the entering threshold voltage ASYNC ENTER (e.g. 4.5V) of the asynchronous mode but higher than the exiting threshold voltage ASYNC EXIT (e.g. 4.4V) of the asynchronous mode. In this case, the forced maintaining signal IS of the forced maintaining circuit ISAM may be zero, and the asynchronous mode ASYNC may be maintained. Since the forced maintaining signal IS of the forced maintaining circuit ISAM is zero, a forced maintaining function of the forced maintaining circuit ISAM is off (IS OFF).

At T13, the input voltage VIN may be glitched again to have a voltage lower than the exiting threshold voltage ASYNC EXIT (e.g. 4.4V) of the asynchronous mode. Therefore, the converting mode may be switched from the asynchronous mode ASYNC to the synchronous mode SYNC, and the forced maintaining function of the forced maintaining circuit ISAM is kept off (IS OFF).

According to one embodiment, the switching between the asynchronous mode ASYNC and the synchronous mode SYNC may depend on the hysteresis voltage HYS that corresponds to the difference between the entering threshold voltage ASYNC ENTER and the exiting threshold voltage ASYNC EXIT of the asynchronous mode. In the present example, the hysteresis voltage HYS is 100 mV. However, this is only an example, and the hysteresis voltage HYS may have a different value without deviating from the scope of the present disclosure.

Referring to FIG. 9, the input voltage VIN (e.g., 4.52V) exceeds the entering threshold voltage ASYNC ENTER (e.g. 4.5V) of the asynchronous mode at T21. At this time, the asynchronous mode ASYNC may start.

At T22 after a deglitch time IS DG has elapsed from T21, the input voltage VIN is still higher than the entering threshold voltage ASYNC ENTER of the asynchronous mode. In this case, the forced maintaining signal IS of the forced maintaining circuit ISAM may be one, and the asynchronous mode ASYNC may be forcibly maintained during the forced maintaining period MT from T22. Since the forced maintaining signal IS of the forced maintaining circuit ISAM is one, the forced maintaining function of the forced maintaining circuit ISAM is on (IS ON).

At T23 and subsequently at T24, the input voltage VIN is still higher than the entering threshold voltage ASYNC ENTER of the asynchronous mode in the forced maintaining period MT after T22. Therefore, the forced maintaining period MT may be reset and be extended from T24, and the forced maintaining function of the forced maintaining circuit ISAM is kept on (IS ON).

At T25 after the forced maintaining period MT has elapsed from T24, the input voltage VIN (e.g., 4.46V) is lower than the entering threshold voltage ASYNC ENTER (e.g., 4.5V) of the asynchronous mode but higher than the exiting threshold voltage ASYNC EXIT (e.g., 4.4V) of the asynchronous mode. In this case, the asynchronous mode ASYNC may be maintained, but the forced maintaining function may be off (IS OFF).

Referring to FIG. 10, the input voltage VIN (e.g., 4.55V) exceeds the entering threshold voltage ASYNC ENTER (e.g. 4.5V) of the asynchronous mode at T31. At this time, the asynchronous mode ASYNC may start.

At T32 after a deglitch time IS DG has elapsed from T31, the input voltage VIN is still higher than the entering threshold voltage ASYNC ENTER of the asynchronous mode. In this case, the forced maintaining signal IS of the forced maintaining circuit ISAM may be one, and the asynchronous mode ASYNC may be forcibly maintained during the forced maintaining period MT from T32. Since the forced maintaining signal IS of the forced maintaining circuit ISAM is one, the forced maintaining function of the forced maintaining circuit ISAM is on (IS ON).

While in the forced maintaining period MT after T32, the input voltage VIN may fluctuate, for example, due to a noise or a change in the output load. In the present example, the input voltage VIN gets lower than the exiting threshold voltage ASYNC EXIT (e.g., 4.4V) of the asynchronous mode at T33), but at the end of the forced maintaining period MT (e.g., at T34), the input voltage VIN gets higher than the exiting threshold voltage ASYNC EXIT (e.g., 4.4V) of the asynchronous mode. Therefore, the synchronous mode SYNC may start at the end of the forced maintaining period MT at T34, and the forced maintaining function of the forced maintaining circuit ISAM may be off (IS OFF).

Subsequently at T35, the input voltage VIN exceeds the entering threshold voltage ASYNC ENTER of the asynchronous mode again in the synchronous mode operation SYNC, therefore the asynchronous mode ASYNC may start again, and the deglitch time IS DG may be set. At T36 after the deglitch time IS DG has elapsed, the input voltage VIN is lower than the entering threshold voltage ASYNC ENTER of the asynchronous mode but is higher than the exiting threshold voltage ASYNC EXIT of the asynchronous mode. Therefore, the forced maintaining signal IS of the forced maintaining circuit ISAM may be zero (IS OFF), and the asynchronous mode ASYNC may be maintained.

FIG. 11 is a table illustrating a case in which the entering threshold voltage ASYNC ENTER of the asynchronous mode of the first converting part 642 of FIG. 6 is changed by setting. FIG. 12 is a table illustrating a case in which the deglitch time IS DG of the forced maintaining circuit ISAM of FIG. 7 is changed by setting. FIG. 13 is a table illustrating a case in which the difference between the entering threshold voltage ASYNC ENTER and the exiting threshold voltage ASYNC EXIT of the asynchronous mode of the first converting part 642 of FIG. 6 is changed by setting. FIG. 14 is a table illustrating a case in which the forced maintaining period MT of the forced maintaining circuit ISAM of FIG. 7 is changed by setting.

Referring to FIG. 11, the entering threshold voltage ASYNC ENTER of the asynchronous mode of the first converting part 642 may be changed by setting. For example, when a setting value SET is one, the entering threshold voltage ASYNC ENTER may be set to 4.5V, when the setting value SET is two, the entering threshold voltage ASYNC ENTER may be set to 4.45V, when the setting value SET is three, the entering threshold voltage ASYNC ENTER may be set to 4.4V, and when the setting value SET is four, the entering threshold voltage ASYNC ENTER may be set to 4.35V. In the present example, the entering threshold voltage ASYNC ENTER is adjusted in an increment of 50 mV according to the setting value SET. It is understood that these set values and increments of the entering threshold voltage ASYNC ENTER are only examples, and they may be varied and/or other numbers of setting may be used without deviating from the scope of the present disclosure.

Referring to FIG. 12, the deglitch time IS DG of the forced maintaining circuit ISAM of the first converting part 642 may be changed by setting. For example, when a setting value SET is one, the deglitch time IS DG may be set to zero (a direct start), when the setting value SET is two, the deglitch time IS DG may be set to 100 μs, when the setting value SET is three, the deglitch time IS DG may be set to 500 μs, and when the setting value SET is four, the deglitch time IS DG may be set to 1 ms. A default value of the deglitch time IS DG may be zero. If the deglitch time IS DG is set to zero, the asynchronous mode ASYNC may directly (or immediately) start even when one temporal pulse of the input voltage VIN may exceed the entering threshold voltage ASYNC ENTER of the asynchronous mode. Since an efficiency of the first converting part 642 in the asynchronous mode ASYNC is less than an efficiency of the first converting part 642 in the synchronous mode SYNC, it may be advantageous not to directly or immediately start to operate the asynchronous mode ASYNC based on the one temporal pulse of the input voltage VIN. The deglitch time IS DG that is set to be great may prevent the start of the asynchronous mode ASYNC for the one temporal pulse of the input voltage VIN. It is understood that these set values and increments of the deglitch time IS DG are only examples, and they may be varied and/or other numbers of setting may be used without deviating from the scope of the present disclosure.

Referring to FIG. 13, the hysteresis voltage HYS that corresponds to a difference between the entering threshold voltage ASYNC ENTER and the exiting threshold voltage ASYNC EXIT of the asynchronous mode of the first converting part 642 may be changed by setting. For example, when a setting value SET is one, the hysteresis voltage HYS may be set to 25 mV, when the setting value SET is two, the hysteresis voltage HYS may be set to 50 mV, when the setting value SET is three, the hysteresis voltage HYS may be set to 70 mV, and when the setting value SET is four, the hysteresis voltage HYS may be 100 mV. The hysteresis voltage HYS set to be great may reduce the number of times of switching between the synchronous mode and the asynchronous mode. It is understood that these set values and increments of the hysteresis voltage HYS are only examples, and they may be varied and/or other numbers of setting may be used without deviating from the scope of the present disclosure.

Referring to FIG. 14, the forced maintaining period MT of the forced maintaining circuit ISAM may be changed by setting. For example, when a setting value SET is one, the forced maintaining period MT may be set to 17 ms, when the setting value SET is two, the forced maintaining period MT may be set to 34 ms, when the setting value SET is three, the forced maintaining period MT may be set to 51 ms, and when the setting value SET is four, the forced maintaining period MT may be set to 68 ms. In the present example, the forced maintaining period MT is adjusted in an increment of 17 ms according to the setting value SET. The increment of 17 ms may correspond to one frame when a driving frequency of the display panel 100 is 60 Hz. The forced maintaining period MT that is set to be long may reduce the number of times of switching between the synchronous mode and the asynchronous mode. It is understood that these set values and increments of the forced maintaining period MT are only examples, and they may be varied and/or other numbers of setting may be used without deviating from the scope of the present disclosure.

Figure 15:
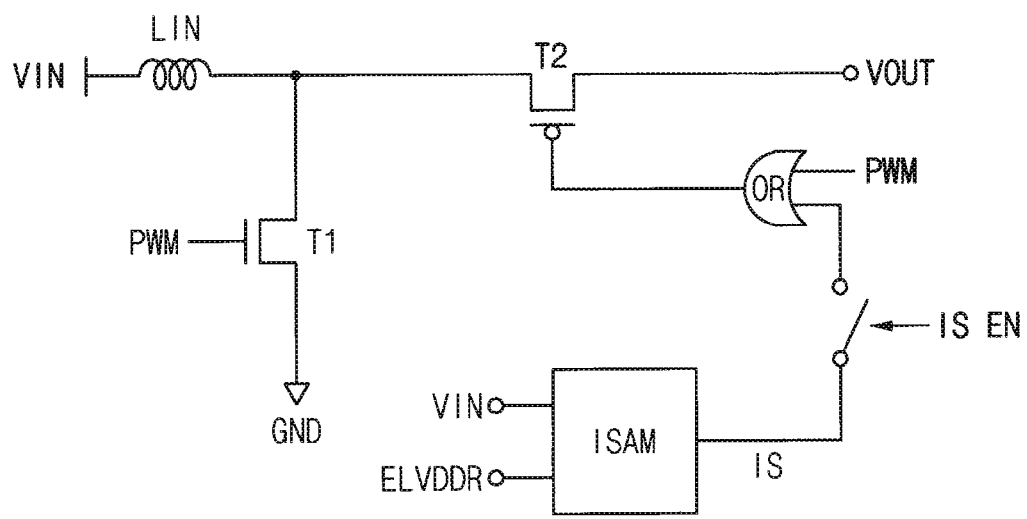
FIG. 15 is a circuit diagram illustrating the first converting part of FIG. 3 according to another embodiment of the present inventive concept.

FIG. 15 is a circuit diagram illustrating the first converting part 642 of FIG. 3 according to another embodiment of the present inventive concept.

Referring to FIG. 15, the first converting part 642 includes the first switching element T1, the second switching element T2, and the forced maintaining circuit ISAM. The first switching element T1 may be turned on and off based on the first switching control signal PWM1. The second switching element T2 may be connected to the first switching element T1. In the synchronous mode, the second switching element T2 may be turned on and off based on the second switching control signal PWM2. In the asynchronous mode, the second switching element T2 may be turned off, and the second switching element T2 may operate in the diode mode. The forced maintaining circuit ISAM may be connected to the second switching element T2. The forced maintaining circuit ISAM may maintain the asynchronous mode for the forced maintaining period MT after entering the asynchronous mode.

The first converting part 642 may further include an OR gate that operates an OR operation for the second switching control signal PWM2 and the forced maintaining signal IS that is received from the forced maintaining circuit ISAM and outputs a result of the OR operation to a control electrode of the second switching element T2.

In the present embodiment, the first converting part 642 may further include a forced maintaining circuit activating switch IS EN disposed between the forced maintaining circuit ISAM and the second switching element T2. The forced maintaining circuit activating switch IS EN may enable and disable a function of the forced maintaining circuit ISAM.

The forced maintaining circuit ISAM may be connected to the OR gate based on the forced maintaining circuit activating switch IS EN. In a case where the function of the forced maintaining circuit ISAM is enabled, the forced maintaining circuit ISAM may operate as described with reference to FIGS. 6 to 10. In a case where the function of the forced maintaining circuit ISAM is disabled, zero may be applied to the OR gate so that the second switching element T2 may be operated in response only to the second switching control signal PWM2.

According to the present embodiment, the voltage converter 640 may operate in the synchronous mode SYNC and the asynchronous mode ASYNC according to the level of the input voltage VIN, and the voltage converter 640 may stably generate the output voltage ELVDD even though the input voltage VIN is higher than the output voltage ELVDD.

In addition, the entering threshold voltage ASYNC ENTER and the exiting threshold voltage ASYNC EXIT of the asynchronous mode may be set differently so that the converting mode may not be frequently switched in a case where the input voltage VIN fluctuates near the entering threshold voltage ASYNC ENTER and the exiting threshold voltage ASYNC EXIT.

In addition, when entering the asynchronous mode ASYNC from the synchronous mode SYNC, the asynchronous mode ASYNC may be forcibly maintained during the forced maintaining period MT. Accordingly, a frequent change of the converting mode due to a noise at the input voltage VIN of the voltage converter 640 may be efficiently prevented thereby preventing the flicker of the display panel 100. Thus, the display quality of the display panel 100 may be enhanced.

According to the embodiments of the voltage converter 640 and the method of voltage conversion and the display apparatus, the display quality of the display panel 100 may be enhanced.

The foregoing is illustrative of the present inventive concept and is not to be construed as limiting thereof. Although some embodiments of the inventive concept have been described in the present disclosure, those skilled in the art will readily appreciate that modifications are possible in the disclosed embodiments without materially departing from the novel teachings and advantages of the present inventive concept. Accordingly, such modifications are intended to be included within the scope of the present inventive concept. In the claims, means-plus-function clauses are intended to cover structures described herein as performing the recited function and not only structural equivalents but also equivalent structures. Therefore, it is to be understood that the foregoing is illustrative of the present inventive concept and is not to be construed as limited to the specific embodiments disclosed herein, and that modifications to the disclosed embodiments, as well as other embodiments, are intended to be included within the scope of the present disclosure. The present inventive concept may be defined by the following claims, with equivalents of the claims to be included therein.

What is claimed is:

1. A voltage converter comprising:
   a first switching element configured to operate based on a first switching control signal;
   a second switching element connected to the first switching element, wherein the second switching element is configured to operate based on a second switching control signal in a synchronous mode, and the second switching element is further configured to operate in a diode mode in an asynchronous mode;
   a forced maintaining circuit configured to maintain the asynchronous mode for a forced maintaining period after entering the asynchronous mode; and an OR gate connected between the forced maintaining circuit and a control electrode of the second switching element and configured to operate an OR operation for the second switching control signal and a forced maintaining signal of the forced maintaining circuit.

2. The voltage converter of claim 1, wherein the second switching element comprises a body diode and the body diode of the second switching element is off in the synchronous mode.

3. The voltage converter of claim 2, wherein the second switching element is turned off and the body diode of the second switching element is on in the asynchronous mode.

4. The voltage converter of claim 3, wherein an entering threshold voltage of the asynchronous mode to enter the asynchronous mode from the synchronous mode is different from an exiting threshold voltage of the asynchronous mode to exit from the asynchronous mode to the synchronous mode.

5. The voltage converter of claim 4, wherein the entering threshold voltage of the asynchronous mode is higher than the exiting threshold voltage of the asynchronous mode.

6. The voltage converter of claim 1, wherein the forced maintaining circuit comprises:
   a comparator configured to compare an input voltage and an output reference voltage and generate a comparison signal;
   a counter configured to receive the comparison signal of the comparator and generate a count signal; and
   a latch configured to receive the comparison signal of the comparator and the count signal of the counter and output the forced maintaining signal.

7. The voltage converter of claim 6, wherein the comparison signal of one represents entering the asynchronous mode, and
   wherein when the comparison signal is one, the counter is reset and configured to start to count the forced maintaining period and the count signal of the counter is zero.

8. The voltage converter of claim 7, wherein the count signal of zero represents that the forced maintaining period is in progress,
   wherein when the count signal is zero, the forced maintaining signal is one, and
   wherein when the forced maintaining signal is one, the asynchronous mode is forcibly maintained.

9. The voltage converter of claim 7, wherein when the forced maintaining period expires, the counter is configured to output the count signal of one,
   wherein when the count signal is one and the comparison signal is zero, the forced maintaining signal is zero, and
   wherein when the comparison signal is zero, the asynchronous mode is not forcibly maintained.

10. The voltage converter of claim 1, wherein when an input voltage exceeds an entering threshold voltage of the asynchronous mode, the asynchronous mode starts, and
    wherein when the input voltage is lower than the entering threshold voltage of the asynchronous mode and higher than an exiting threshold voltage of the asynchronous mode after a deglitch time has elapsed since the asynchronous mode started, the forced maintaining signal of the forced maintaining circuit is zero and the asynchronous mode is maintained.

11. The voltage converter of claim 1, wherein when an input voltage exceeds an entering threshold voltage of the asynchronous mode, the asynchronous mode starts, and
    wherein when the input voltage is higher than the entering threshold voltage of the asynchronous mode after a deglitch time has elapsed the asynchronous mode started, the forced maintaining signal of the forced maintaining circuit is one and the asynchronous mode is forcibly maintained during the forced maintaining period.

12. The voltage converter of claim 1, wherein when an input voltage exceeds an entering threshold voltage of the asynchronous mode, the asynchronous mode starts,
    wherein when the input voltage is higher than the entering threshold voltage of the asynchronous mode after a deglitch time has elapsed since the asynchronous mode started, the forced maintaining signal of the forced maintaining circuit is one and the asynchronous mode is forcibly maintained during the forced maintaining period, and
    wherein when the input voltage gets lower than an exiting threshold voltage of the asynchronous mode in the forced maintaining period, the synchronous mode starts at an end of the forced maintaining period.

13. The voltage converter of claim 1, further comprising an activating switch disposed between the forced maintaining circuit and the second switching element,
    wherein the activating switch is configured to enable and disable the forced maintaining circuit.

14. A method of voltage conversion, the method comprising:
    operating a first switching element based on a first switching control signal;
    in a synchronous mode, operating a second switching element based on a second switching control signal;
    in an asynchronous mode, operating the second switching element in a diode mode by turning off the second switching element; and
    maintaining the asynchronous mode for a forced maintaining period after entering the asynchronous mode using a forced maintaining circuit that is connected to the second switching element and an OR gate that is connected between the forced maintaining circuit and the second switching element, and configured to operate an OR operation for the second switching control signal and a forced maintaining signal of the forced maintaining circuit.

15. The method of claim 14, wherein the second switching element comprises a body diode, and the body diode of the second switching element is off in the synchronous mode.

16. The method of claim 15, wherein the second switching element is turned off and the body diode of the second switching element is on in the asynchronous mode.

17. The method of claim 14, further comprising:
    starting the asynchronous mode when an input voltage exceeds an entering threshold voltage of the asynchronous mode; and
    determining whether the input voltage is higher than the entering threshold voltage of the asynchronous mode after a deglitch time has elapsed since the asynchronous mode started.

18. The method of claim 17, wherein, when the input voltage is higher than the entering threshold voltage of the asynchronous mode after the deglitch time has elapsed since the asynchronous mode started, the asynchronous mode is forcibly maintained during the forced maintaining period using the forced maintaining circuit.

19. A display apparatus comprising:
    a display panel comprising a plurality of gate lines, a plurality of data lines, and a plurality of pixels connected to the plurality of gate lines and the plurality of data lines;

a gate driver configured to output a gate signal to the plurality of gate lines;

a data driver configured to output a data voltage to the plurality of data lines; and a power voltage generator configured to provide a power voltage to the display panel, wherein the power voltage generator comprises:

a first switching element configured to operate based on a first switching control signal;

a second switching element connected to the first switching element, wherein the second switching element is configured to operate based on a second switching control signal in a synchronous mode, and the second switching element is further configured to operate in a diode mode in an asynchronous mode;

a forced maintaining circuit configured to maintain the asynchronous mode for a forced maintaining period after entering the asynchronous mode; and an OR gate connected between the forced maintaining circuit and a control electrode of the second switching element and configured to operate an OR operation for the second switching control signal and a forced maintaining signal of the forced maintaining circuit.

\* \* \* \* \*